United States Patent
Scott

(10) Patent No.: US 6,913,099 B2
(45) Date of Patent: Jul. 5, 2005

(54) MOUNTING CONFIGURATION AND METHOD FOR A MOTORCYCLE SEAT

(75) Inventor: John S. Scott, Brookfield, WI (US)

(73) Assignee: Harley Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/617,426

(22) Filed: Jul. 11, 2003

(65) Prior Publication Data

US 2005/0006159 A1 Jan. 13, 2005

(51) Int. Cl.[7] .................................................. B62J 1/00
(52) U.S. Cl. .................. 180/219; 280/288.4; 297/195.1
(58) Field of Search ...................... 180/219; 280/288.4; 297/195.1, 195.13

(56) References Cited

U.S. PATENT DOCUMENTS 6,273,207 B1 * 8/2001 Brown ........................ 180/219
6,354,476 B1 * 3/2002 Alderman .................... 224/413
2003/0112633 A1 * 6/2003 Takeuchi et al. ............ 362/487

OTHER PUBLICATIONS

Custom Chrome, 1989 Catalog, Jan. 1, 1989, p. 44.
Custom Chrome, 1994 Custom Chrome Catalog, Jan. 1, 1994, pp. 111 and 157–158.

* cited by examiner

Primary Examiner—Kevin Hurley
(74) Attorney, Agent, or Firm—Michael Best & Friedrich,LLP

(57) ABSTRACT

A motorcycle having a frame and a seat mounting stud extending upwardly from a seat support of the frame. A seat assembly includes a seat pan having a forward mounting tab that is coupled to the frame adjacent a fuel tank, a rearward mounting tab extending rearwardly from the seat pan and coupled to a rear fender, and a mounting aperture positioned between the forward and rearward mounting tabs. The mounting stud is received within the mounting aperture and cooperates with the forward and rearward mounting tabs to couple the seat assembly to the frame. A method for installing the seat assembly is also provided.

11 Claims, 6 Drawing Sheets

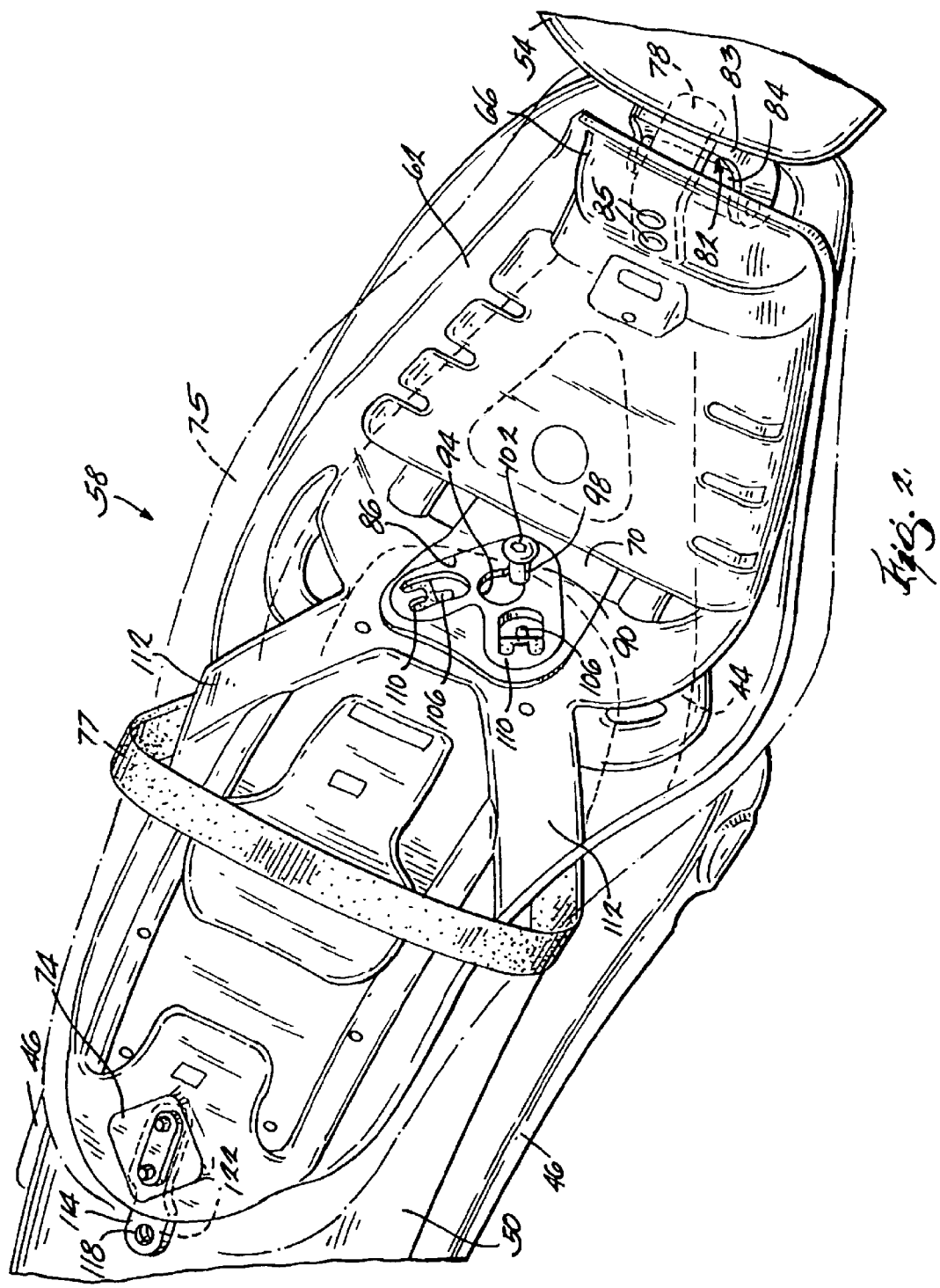

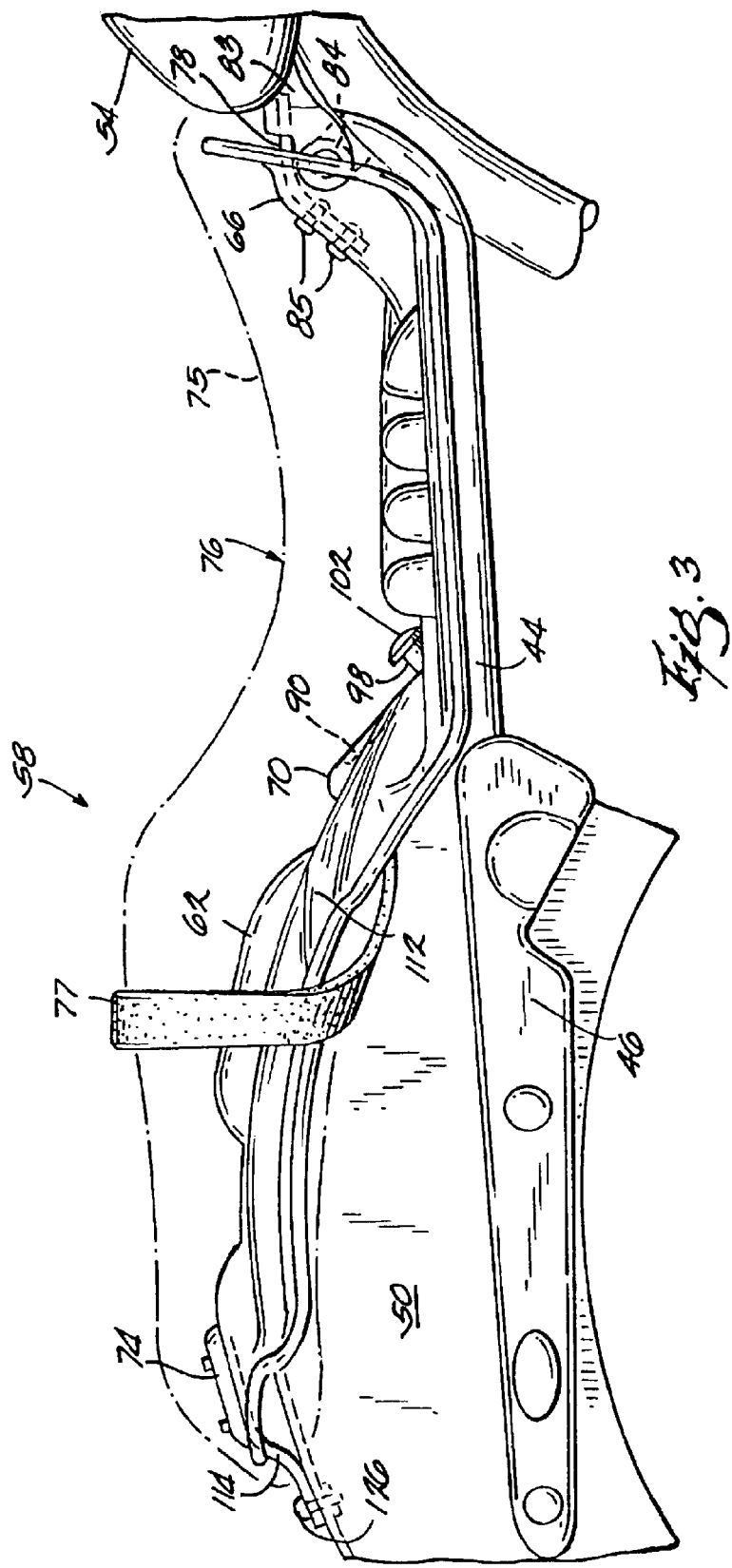

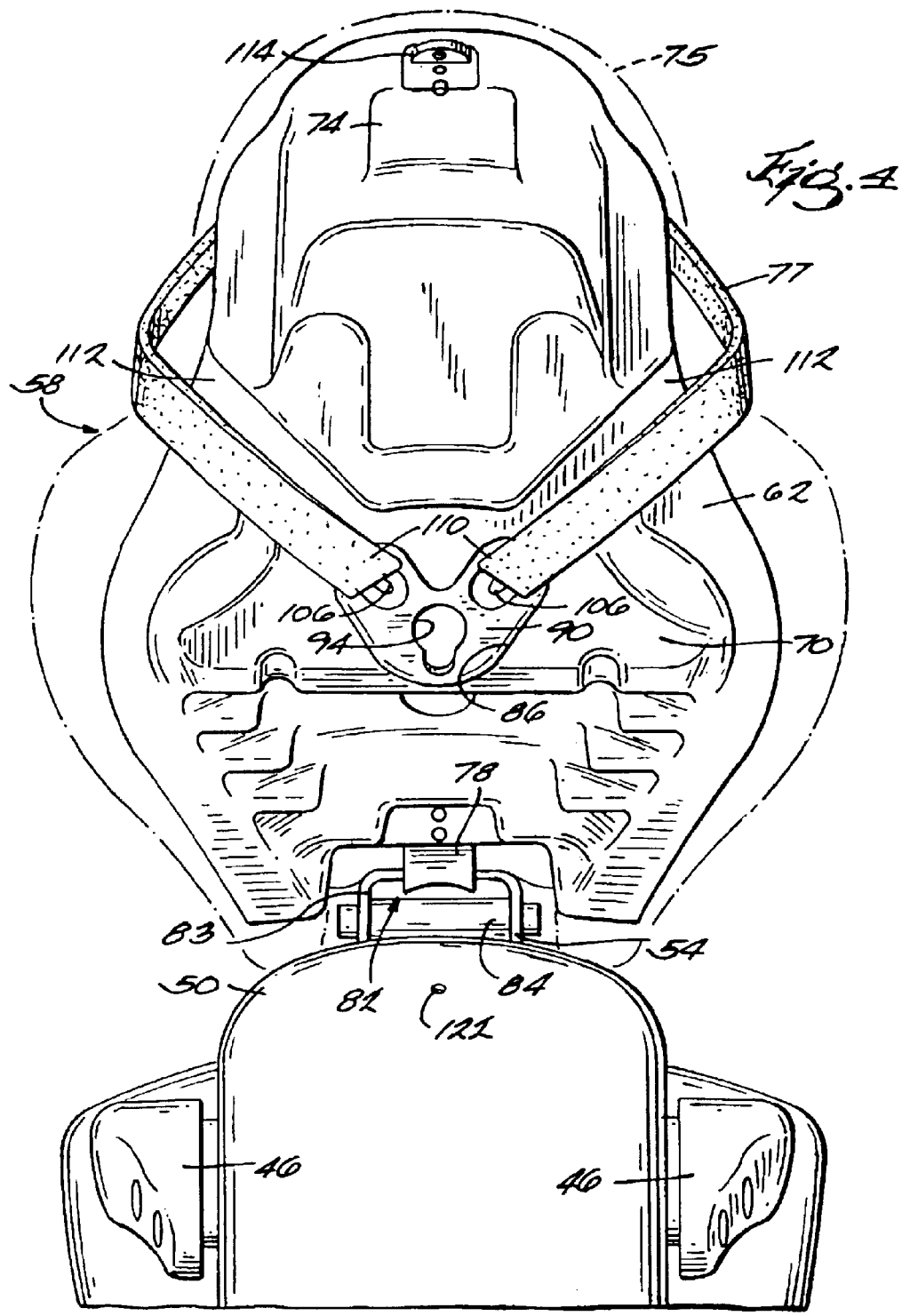

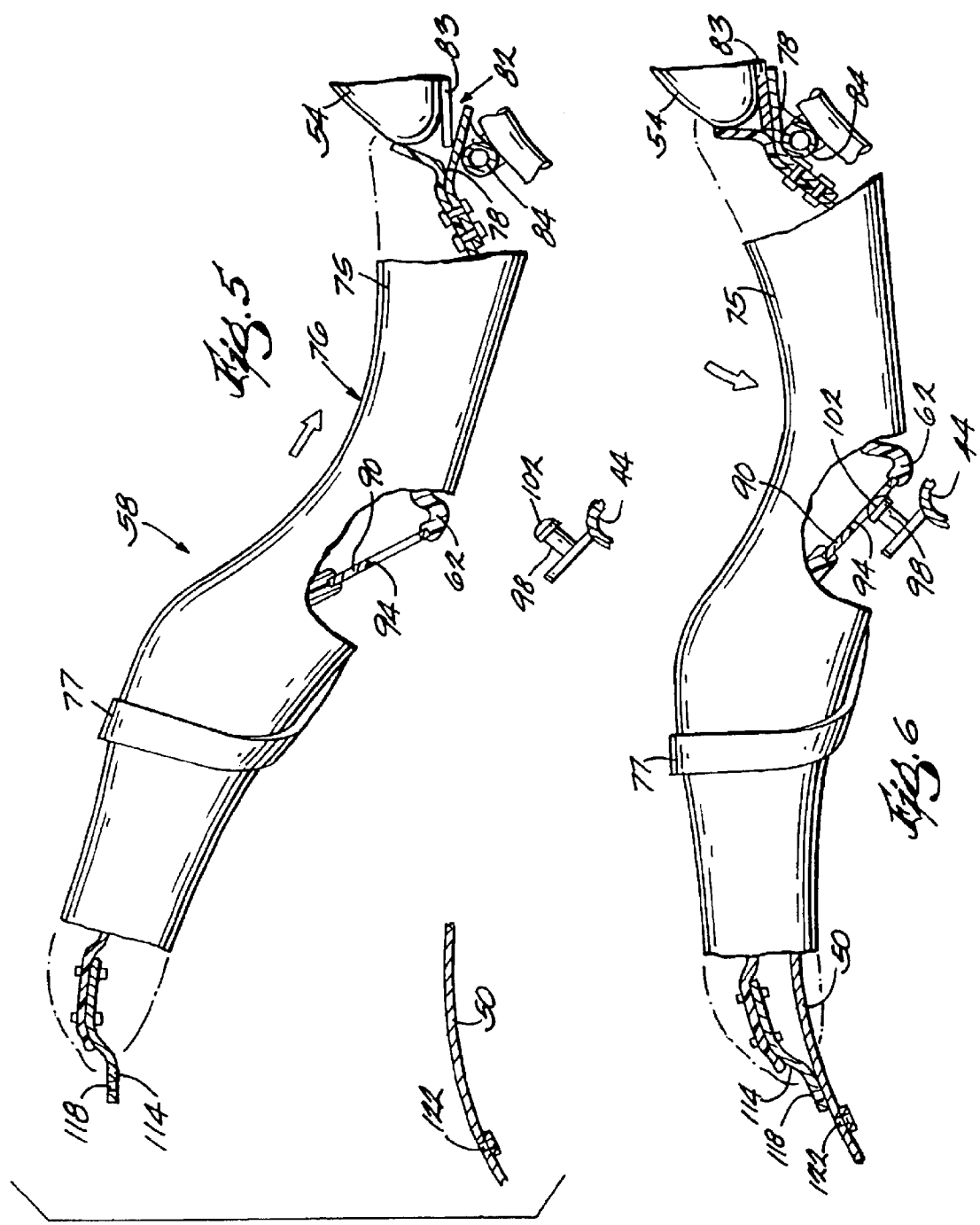

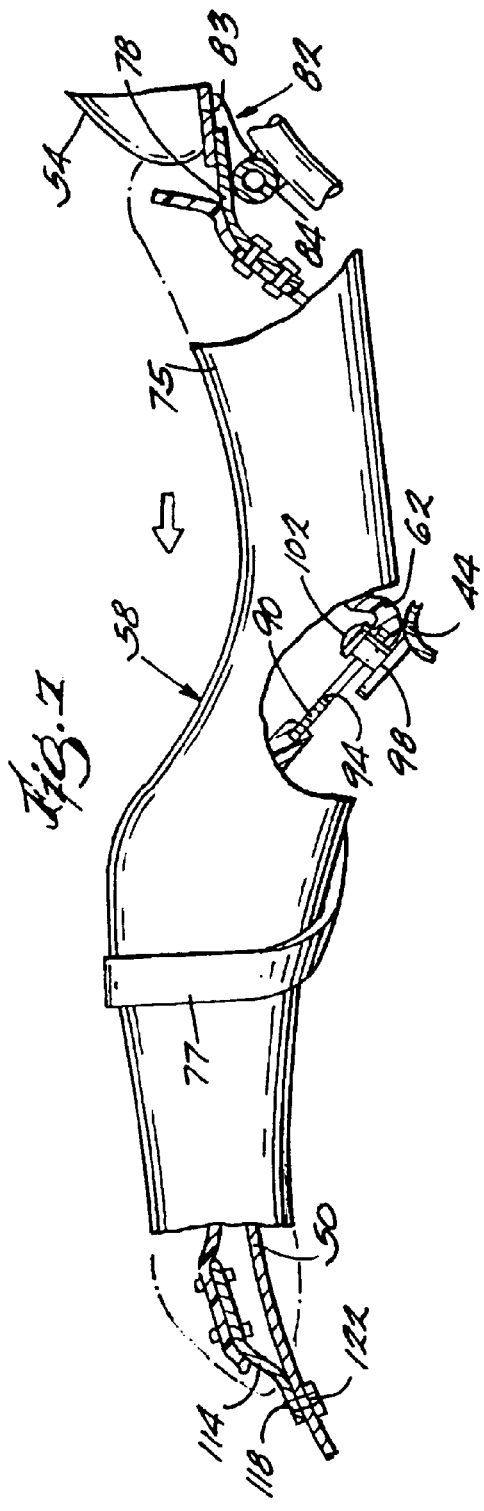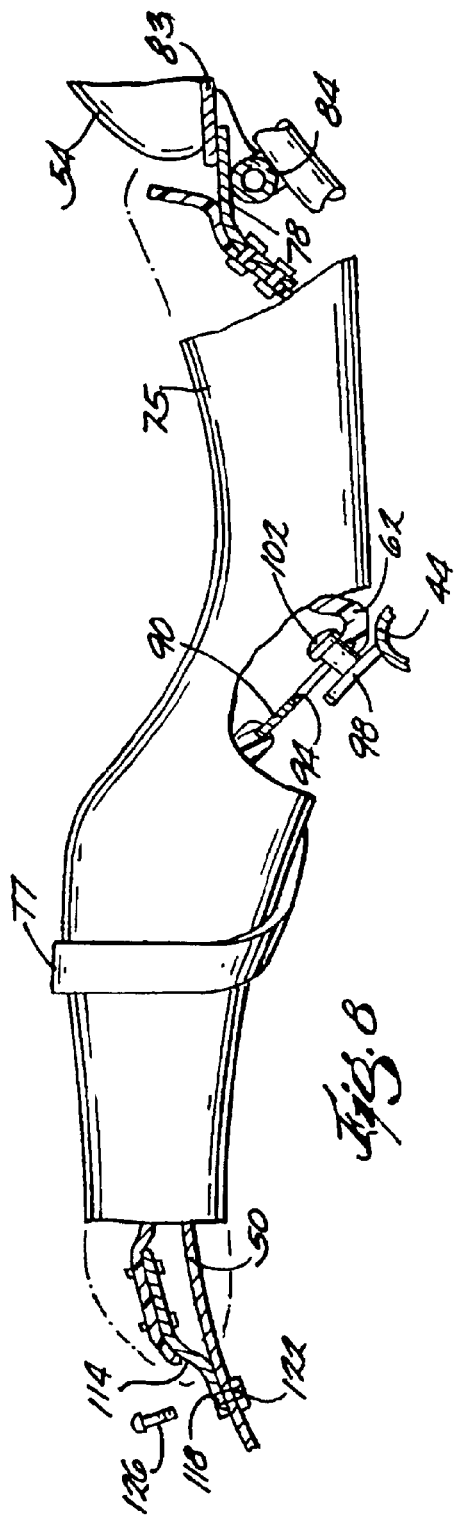

MOUNTING CONFIGURATION AND METHOD FOR A MOTORCYCLE SEAT

FIELD OF THE INVENTION

The present invention relates to motorcycles, and more specifically to mounting configurations for motorcycle seats.

BACKGROUND

Motorcycles are provided with various types of seats for the comfort of motorcycle operators and passengers. Motorcycle seats can be coupled to the motorcycle in a variety of ways, including hinging the seat to the motorcycle frame, or bolting the motorcycle seat to the frame. Other motorcycle seats may be provided with hidden storage compartments, and may be coupled to the motorcycle using a keyed lock.

SUMMARY

One embodiment of the present invention provides a motorcycle having a frame and a seat mounting stud extending upwardly from a seat support of the frame. In one construction, a seat assembly includes a seat pan having a forward mounting tab extending forwardly from the seat pan and coupled to the frame adjacent a fuel tank, a rearward mounting tab extending rearwardly from the seat pan and coupled to a rear fender, and a mounting aperture positioned between the forward and rearward mounting tabs. The mounting stud is received within the mounting aperture and cooperates with the forward and rearward mounting tabs to couple the seat assembly to the frame. In some constructions, the locations of the mounting stud and the mounting aperture can be switched, such that the seat support defines the mounting aperture, and the mounting stud extends from the seat pan.

Other features of the invention will become apparent to those skilled in the art upon review of the following detailed description, claims, and drawings.

BRIEF DESCRIPTION OF THE DRAWINGS

FIG. 2 is a perspective view of a seat assembly of the motorcycle illustrated in FIG. 1.

FIG. 3 is a side view of the seat assembly illustrated in FIG. 2.

FIG. 4 is a rear view of the seat assembly with the seat assembly pivoted upwardly.

FIG. 5 is a side view of the seat assembly with portions shown in section illustrating a first step for installing the seat assembly on the motorcycle.

FIG. 6 is a side view illustrating a second step for installing the seat assembly on the motorcycle.

FIG. 7 is a side view illustrating a third step for installing the seat assembly on the motorcycle.

FIG. 8 is a side view illustrating a fourth step for installing the seat assembly on the motorcycle.

Figure 1:
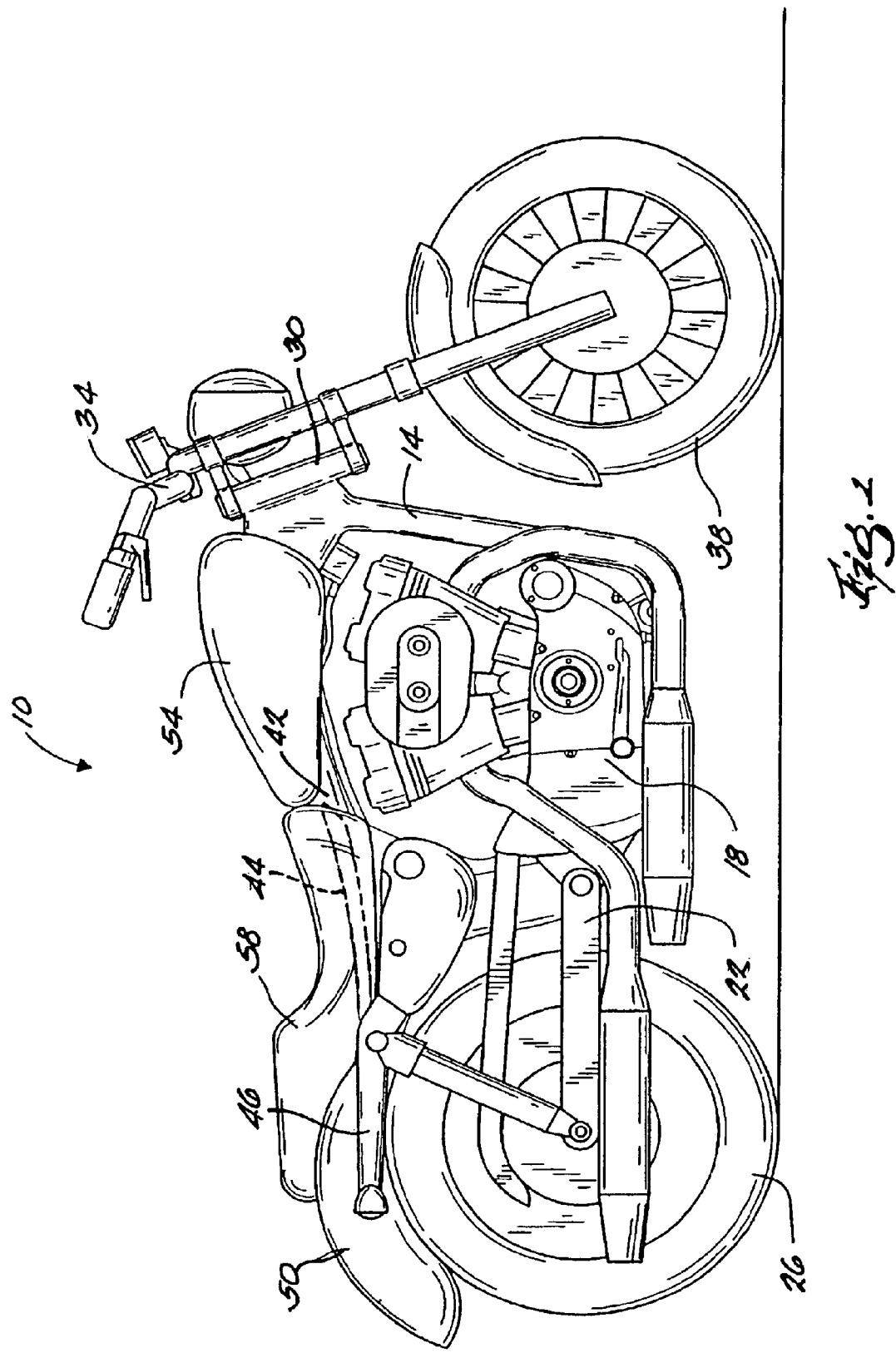
FIG. 1 is a side view of a motorcycle embodying some aspects of the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a motorcycle 10 including a frame assembly 14, and an engine assembly 18 supported by the frame assembly 14. A swingarm 22 is pivotally coupled to the engine assembly 18 and supports a rear wheel 26. The frame 14 includes a steering head 30 that pivotally supports a steering assembly 34, which in turn supports a front wheel 38. An upper frame member or backbone 42 extends rearwardly from the steering head 30 and bends downwardly toward the swingarm 22. A seat support 44 extends rearwardly from the backbone 42 to a pair of fender supports 46 that support a rear fender 50 above the rear wheel 26. A fuel tank 54 is coupled to the backbone 42 and extends generally from the steering head 30 to the bent area of the backbone 42. A seat assembly 58 extends rearwardly from the fuel tank 54 and is supported by the backbone 42, the seat support 44, and the rear fender 50 as discussed further below.

Referring to FIGS. 2–4, the seat assembly 58 includes a seat pan 62 which, in the illustrated embodiment, is formed of a polymer. The seat pan 62 is formed and contoured to closely follow the shape of the backbone 42, the seat support 44, and the rear fender 50. The seat pan 62 includes a forward mounting portion 66, a central mounting portion 70, and a rearward mounting portion 74. The seat assembly 58 also includes a seat cushion 75 (illustrated in phantom) that overlies the seat pan 62 and that provides a seating surface 76 (see FIG. 3) for the motorcycle operator and passenger. The seat cushion 75 is formed of a resilient material, such as foam rubber, covered with a suitable fabric, such as vinyl or leather. A grab strap 77 extends from the seat pan 62 around the seat cushion 75 for grasping by the motorcycle passenger.

The forward mounting portion 66 of the seat pan 62 includes a forward mounting tab 78 that slides into a cavity 82 defined between the backbone 42 and the fuel tank 54 (see FIG. 4). Specifically, the forward mounting tab 78 slides between a mounting bracket 83 that is coupled to the fuel tank 54, and a mounting boss 84 that extends generally upwardly from the seat support 44. The forward mounting tab 78 is formed of a material having increased strength with respect to the seat pan material. In the illustrated construction, the forward mounting tab 78 is steel. The forward mounting tab 78 is coupled to the forward mounting portion 66 by suitable fasteners 85 such as bolts, screws, rivets, or the like.

The central mounting portion 70 defines a generally V-shaped aperture 86. Positioned within the aperture 86 is a mounting plate 90 that, like the mounting tab 78, is formed of a material having increased strength with respect to the seat pan material (e.g. steel, as in the illustrated construction). The mounting plate 90 can be coupled to the seat pan 62 using suitable fasteners, such as those discussed above, or, as in the illustrated construction, can be integrally molded into the seat pan 62. The mounting plate 90 defines a frame mount in the form of a generally keyhole-shaped opening 94 that is positioned in the lower portion of the V-shaped aperture 86. The keyhole opening 94 receives a seat mount in the form of a mounting stud 98 that extends generally upwardly and forwardly from the seat support 44. The mounting stud 98 is configured with an enlarged end portion 102 sized such that when the mounting stud 98 is positioned in a large portion of the keyhole opening 94, the enlarged end portion 102 can pass freely through the opening 94 and the mounting stud 98 and keyhole opening 94 are unlatched. However when the mounting stud 98 is positioned in a small portion of the keyhole opening 94, the enlarged end portion 102 cannot pass through the opening 94 and the mounting stud 98 and keyhole opening 94 are latched together.

The mounting plate 90 also defines a pair of angled posts or tabs 106 that are positioned in the leg portions of the V-shaped aperture 86. Respective end portions 110 of the grab strap 77 are provided with holes or apertures (not shown) that are coupled (e.g. by hooking) to the angled tabs 106 such that the grab strap 77 is coupled to the seat pan 62 by the mounting plate 90. As discussed above, the mounting plate 90 has increased strength with respect to the seat pan 62, thereby providing a suitable connection point for carrying loads that may be placed on the grab strap 77 (e.g. by the motorcycle passenger) during motorcycle operation. Channel portions 112 are defined by the seat pan 62 and receive the end portions 110 of the grab strap 77.

The rearward mounting portion 74 of the seat pan 62 includes a rearward mounting tab 114 that extends rearwardly from the seat pan 62 and beyond the seat cushion 75. The rearward mounting tab 114 is also formed of a material having increased strength with respect to the seat pan material. The rearward mounting tab 114, like the mounting plate 90 can be coupled to the seat pan 62 by suitable fasteners, or can be integrally molded into the seat pan 62. The rearward mounting tab 114 defines a mounting aperture 118 that can be aligned with a threaded opening 122 defined by the rear fender 50.

Referring to FIGS. 5–8, the seat assembly 58 is installed by positioning the forward mounting tab 78 between the mounting bracket 83 and the mounting boss 84, and moving the seat assembly 58 in the direction of the arrow in FIG. 5, thereby inserting the mounting tab 78 into the cavity 82. With the forward mounting tab 78 positioned in the cavity 82, the rearward mounting portion 114 is moved downwardly in the direction of the arrow in FIG. 6, such that the forward mounting tab 78 pivots about the mounting boss 84. As the seat assembly 58 is moved downwardly, the keyhole opening 94 is positioned such that the enlarged end portion 102 of the mounting stud 98 is allowed to pass through the large portion of the keyhole opening 94, and the mounting stud 98 and keyhole opening 94 are therefore unlatched. Thus, as illustrated in FIG. 6, the seat assembly 58 is in a released or unlatched position with respect to the frame 14, and the mounting aperture 118 in the rearward mounting tab 114 is positioned forwardly of the threaded opening 122 in the rear fender 50.

The seat assembly 58 is then slid rearwardly in the direction of the arrow in FIG. 7 from the unlatched position to a coupled or latched position. Rearward movement of the seat assembly 58 to the latched position adjusts the position of the mounting stud 98 within the keyhole opening 94 such that the mounting stud 98 is positioned in the small portion of the keyhole opening 94. As mentioned above, the enlarged end portion 102 is therefore unable to be withdrawn from the keyhole opening 94 and the mounting stud 98 and keyhole opening are therefore latched together. Rearward movement of the seat assembly 58 also brings the mounting aperture 118 into alignment with the threaded opening 122 such that a mounting fastener 126 (FIG. 8) can be extended through the mounting aperture 118 and threaded into the threaded opening 122, thereby securing the seat assembly 58 to the motorcycle 10. In this regard, mounting and dismounting of the seat assembly 58 can be accomplished by installing or removing a single fastener.

Several variations to the above-described components are possible, and are within the spirit and scope of the present invention. For example, instead of providing the forward mounting tab 78 on the seat pan 62, and defining the cavity 82 between the backbone 42 and the fuel tank 54, a cavity can alternatively be defined by the seat pan 62 and one of the backbone 42 and the fuel tank 54 can be provided with a tab that is received by the cavity. Similarly, the mounting stud 98 can alternatively be provided on the mounting plate 90, and the frame assembly 14 can be provided with a keyhole-shaped opening, like keyhole opening 94. Furthermore, the tabs 106 need not be formed in the manner illustrated. For example, the tabs 106 can be formed by fasteners, rivets, pins, or substantially any other member that can be used to suitably secure the end portions 110 of the grab strap 77 to the mounting plate 90

The above-described seat assembly 58 and its variations provide a seat assembly in which the seat pan 62 can be of a polymeric construction, thereby reducing costs, while maintaining suitable structural integrity. More specifically, by providing mounting locations that include strength-enhancing components, such as the forward mounting tab 78, the mounting plate 90, and the rearward mounting tab 114, the rigidity with which the seat assembly 58 is coupled to the motorcycle is improved in comparison with a seat pan not including such components. Furthermore, the mounting plate 90 provides a relatively rigid mounting point so that the grab strap 77 can be suitably attached to the seat assembly 58, whereas many prior art seat assemblies had grab straps attached to the frame. Attaching the grab strap 77 directly to the seat assembly 58 simplifies removal of the seat assembly 58 from the motorcycle 10. Attaching the grab strap 77 to the higher strength mounting plate 90 in the above-described manner also reduces the likelihood of detaching the grab strap 77 from the seat assembly 58 by bending, breaking, or otherwise damaging the posts or tabs 106. Loads placed on the grab strap 77 are transmitted from the relatively rigid mounting plate 90 into the frame 14 by way of the mounting stud 98, thereby reducing stresses in the less rigid seat pan 62.

Various features of the invention are set forth in the following claims.

What is claimed is:

1. A motorcycle comprising:
   a frame including a steering head and an upper frame member extending rearwardly from the steering head;
   a fuel tank coupled to the upper frame member;
   a seat mount coupled to the frame; and
   a seat assembly having a seat pan, a front mount coupled to the frame adjacent the fuel tank, a rear mount, and a frame mount located between the front mount and the rear mount and fixed with respect to the seat pan, the frame mount engaging the seat mount and having a latched configuration corresponding to a first position of the seat assembly with respect to the frame, and an unlatched configuration corresponding to a second position of the seat assembly with respect to the frame, the frame mount and the seat mount cooperating with the front and rear mounts to couple the seat assembly to the frame in the latched configuration.

2. The motorcycle of claim 1, wherein the seat mount comprises one of a mounting stud and a mounting aperture, and the frame mount comprises the other of the mounting stud and the mounting aperture.

3. The motorcycle of claim 2, wherein the mounting stud includes an enlarged end portion and the mounting aperture is substantially keyhole-shaped and defines an enlarged portion and a reduced portion, and wherein the enlarged portion is sized to receive the enlarged end portion when the seat assembly is in the second position, and the reduced portion is sized to capture the enlarged end portion when the seat assembly is in the first position, thereby coupling the seat pan to the seat support.

4. The motorcycle of claim 1, wherein the fuel tank cooperates with the frame to define a cavity, and wherein the front mount extends forwardly between the frame and the fuel tank and is received by the cavity.

5. The motorcycle of claim 1, wherein the front mount includes a forward mounting tab that extends forwardly of the seat assembly.

6. The motorcycle of claim 1, wherein the rear mount includes a rearward mounting tab that extends rearwardly of the seat assembly.

7. The motorcycle of claim 6, further comprising a rear fender coupled to the frame and extending above the rear wheel, and a fastener extending through the rearward mounting tab and coupling the rearward mounting tab to the rear fender.

8. A motorcycle comprising:
   a frame including a steering head and an upper frame member extending rearwardly from the steering head;
   a fuel tank coupled to the upper frame member;
   a seat mount coupled to the frame;
   a seat assembly having a front mount coupled to the frame adjacent the fuel tank, a rear mount, and a frame mount located between the front mount and the rear mount, the frame mount engaging the seat mount and having a latched configuration corresponding to a first position of the seat assembly with respect to the frame, and an unlatched configuration corresponding to a second position of the seat assembly with respect to the frame, the frame mount and the seat mount cooperating with the front and rear mounts to couple the seat assembly to the frame in the latched configuration; and
   a seat pan that includes a first portion made of a first material, and a second portion made of a second material having increased strength with respect to the first material, and wherein the frame mount is located on the second portion.

9. The motorcycle of claim 8, wherein the seat assembly includes a seat cushion and a strap coupled to the second portion and extending around the seat cushion.

10. The motorcycle of claim 9, wherein the second portion includes a first mounting post and a second mounting post, and wherein first and second ends of the strap are coupled to the first and second mounting posts respectively.

11. A seat assembly for a motorcycle including a frame having a steering head and an upper frame member extending rearwardly from the steering head, a fuel tank coupled to the upper frame member, and a seat mount coupled to the frame, the seat assembly comprising:
   a seat pan;
   a front mount adapted to couple to the frame adjacent the fuel tank;
   a rear mount; and
   a frame mount located between the front mount and the rear mount and fixed with respect to the seat pan, the frame mount adapted to engage the seat mount and having a latched configuration corresponding to a first position of the seat assembly with respect to the frame, and an unlatched configuration corresponding to a second position of the seat assembly with respect to the frame, the frame mount adapted to cooperate with the seat mount and the front and rear mounts adapted to couple to the frame to couple the seat assembly to the frame in the latched configuration.

* * * * *